(12) United States Patent
Da Deppo et al.

(10) Patent No.: US 10,093,376 B2
(45) Date of Patent: Oct. 9, 2018

(54) MOTORCYCLE CARGO STORAGE SYSTEM

(71) Applicants: Lynn D. Da Deppo, Bloomfield Hills, MI (US); Ehab Kamal, Novi, MI (US); Darek Barczynski, West Bloomfield, MI (US); Steve Bauer, Clarkston, MI (US); David Newkirk, West Bloomfield, MI (US)

(72) Inventors: Lynn D. Da Deppo, Bloomfield Hills, MI (US); Ehab Kamal, Novi, MI (US); Darek Barczynski, West Bloomfield, MI (US); Steve Bauer, Clarkston, MI (US); David Newkirk, West Bloomfield, MI (US)

(73) Assignee: Huf North America Automotive Parts Manufacturing Corp., Milwaukee, WI (US)

(*) Notice: Subject to any disclaimer, the term of this patent is extended or adjusted under 35 U.S.C. 154(b) by 317 days.

(21) Appl. No.: 14/969,680

(22) Filed: Dec. 15, 2015

(65) Prior Publication Data

US 2016/0167727 A1 Jun. 16, 2016

Related U.S. Application Data

(60) Provisional application No. 62/091,825, filed on Dec. 15, 2014.

(51) Int. Cl.
*B62J 9/00* (2006.01)

(52) U.S. Cl.
CPC ..................... *B62J 9/001* (2013.01)

(58) Field of Classification Search
CPC ..... B62J 9/00; B62J 9/001; B62J 9/003; B62J 9/005; B62J 9/006; B62J 9/008; B62J 9/02
See application file for complete search history.

(56) References Cited

U.S. PATENT DOCUMENTS

| | | | | |
|---|---|---|---|---|
| 2,338,477 A | * | 1/1944 | Wolters | A47B 63/00 217/60 R |
| 5,205,073 A | * | 4/1993 | Lyons, Sr. | E02D 29/1418 49/379 |
| 5,520,313 A | * | 5/1996 | Toshihide | B60N 2/4686 220/815 |
| 5,992,680 A | * | 11/1999 | Smith | B65D 90/105 220/812 |
| 6,129,237 A | * | 10/2000 | Miyahara | B65D 43/165 220/255 |
| 6,749,079 B2 | * | 6/2004 | Katagiri | B60R 7/04 220/345.2 |
| 9,718,414 B2 | * | 8/2017 | Da Deppo | B60R 11/04 |
| 2003/0010798 A1 | * | 1/2003 | Galbraith | B62J 9/00 224/413 |
| 2004/0118889 A1 | * | 6/2004 | Hamilton | B62J 9/00 224/413 |
| 2016/0229474 A1 | * | 8/2016 | Carlson | B62J 7/04 |

* cited by examiner

*Primary Examiner* — Corey Skurdal
(74) *Attorney, Agent, or Firm* — Honigman Miller Schwartz and Cohn LLP; Matthew H. Szalach; Jonathan P. O'Brien

(57) ABSTRACT

A motorcycle cargo storage system is disclosed having a lid that is translatable and rotatable relative to a compartment body to permit for the lid to be fully cleared of the access opening of the cargo storage system. The system may further include a securing system that selectively holds the lid of the cargo storage system in a closed position relative to the compartment body.

22 Claims, 7 Drawing Sheets

MOTORCYCLE CARGO STORAGE SYSTEM

CROSS-REFERENCE TO RELATED APPLICATIONS

This application claims priority under 35 U.S.C. § 119(e) to U.S. Provisional Patent Application No. 62/091,825, filed Dec. 15, 2014, the disclosure of which is incorporated by reference in its entirety.

FIELD OF THE INVENTION

The present disclosure relates generally to motorcycle cargo storage systems and, in particular, to improvements in the lid construction of such cargo storage systems to improve access to the storage volume.

BACKGROUND

This section provides background information related to the present disclosure which is not necessarily prior art.

Many motorcycles provide cargo storage to permit a rider to carry items while using the motorcycle. Such cargo storage may be positioned on a rear or sides of the motorcycle, depending on the particular storage design. For example, side-mounted cargo storage may include one or more "saddle bags" located on either or both sides of a centrally-disposed seat. Such saddle bags may include one or more conventional soft-walled bags or, alternatively, one or more substantially hard-walled cases.

Conventionally, motorcycle cargo storage or saddle bags include one or more storage compartments that are covered by a closure such as a lid or flap. Depending on the particular orientation of the cargo storage and manner in which the storage compartment is accessed, the closure may be side-hinged or bottom hinged and, moreover, may be single or double hinged to accommodate access into the storage compartment while also permitting reversible attachment of the closure to the exterior of the bag.

While traditional closure designs for saddle bags adequately restrict access to the storage compartment in a closed state, such closures often restrict access to the storage compartment by blocking an opening to the storage compartment when in an open state.

SUMMARY

This section provides a general summary of the disclosure, and is not a comprehensive disclosure of its full scope or all of its features.

Disclosed herein is an improved motorcycle cargo storage system. This improved motorcycle cargo storage system can include a lid that is connected to a body in such a way that, when the lid is open relative to the body, the lid is tucked behind a rear wall of the compartment and does not obstruct access to the compartment cavity in the way that many flaps do. Further, the improved motorcycle cargo storage system can have a securing system to hold the lid in a closed position relative to the body. This securing system can include a latching mechanism that is selectively coupled to a striker member. In one configuration, the latching mechanism may include an outer cover that supports a decorative logo or emblem.

According to some aspects, a motorcycle cargo storage system includes a compartment body having an inner surface and an outer surface in which the inner surface of the compartment body defines a compartment cavity. A compartment lid is attached to the compartment body and may be movable between an opened position and a closed position by a combination of translation and rotation of the compartment lid relative to the compartment body. The compartment lid has an inner surface and an outer surface and, when the compartment lid is in the closed position, the compartment lid covers the compartment cavity of the compartment body such that the inner surface of the compartment body and the inner surface of the compartment lid are positioned in an adjacent configuration to define an internal storage volume of the motorcycle cargo storage system. When the compartment lid is in the opened position, the compartment lid is positioned behind a rear surface of the compartment body to allow access to the compartment cavity.

A plurality of track connection members may attach the compartment lid to the compartment body and may define a path of translation and rotation of the compartment lid relative to the compartment body between the opened position and the closed position. These may be, for example, cam tracks and followers and may each be disposed on the body, lid, or combinations of both.

The motorcycle cargo storage system can also include a securing system having a latch assembly. When in a locked position with the compartment lid in a closed position, the latch assembly may selectively maintain the compartment lid in place relative to the compartment body to maintain the compartment lid in the closed position. When the latch assembly is moved away from the locked position, movement of the compartment lid relative to the compartment body along the path of translation and rotation is permitted.

These and other aspects of the disclosure will become apparent from the following description. In the description, reference is made to the accompanying drawings which form a part hereof, and in which there is shown a preferred configuration of the disclosure. Such configuration does not necessarily represent the full scope of the disclosure and reference is made therefore, to the claims herein for interpreting the scope of the disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
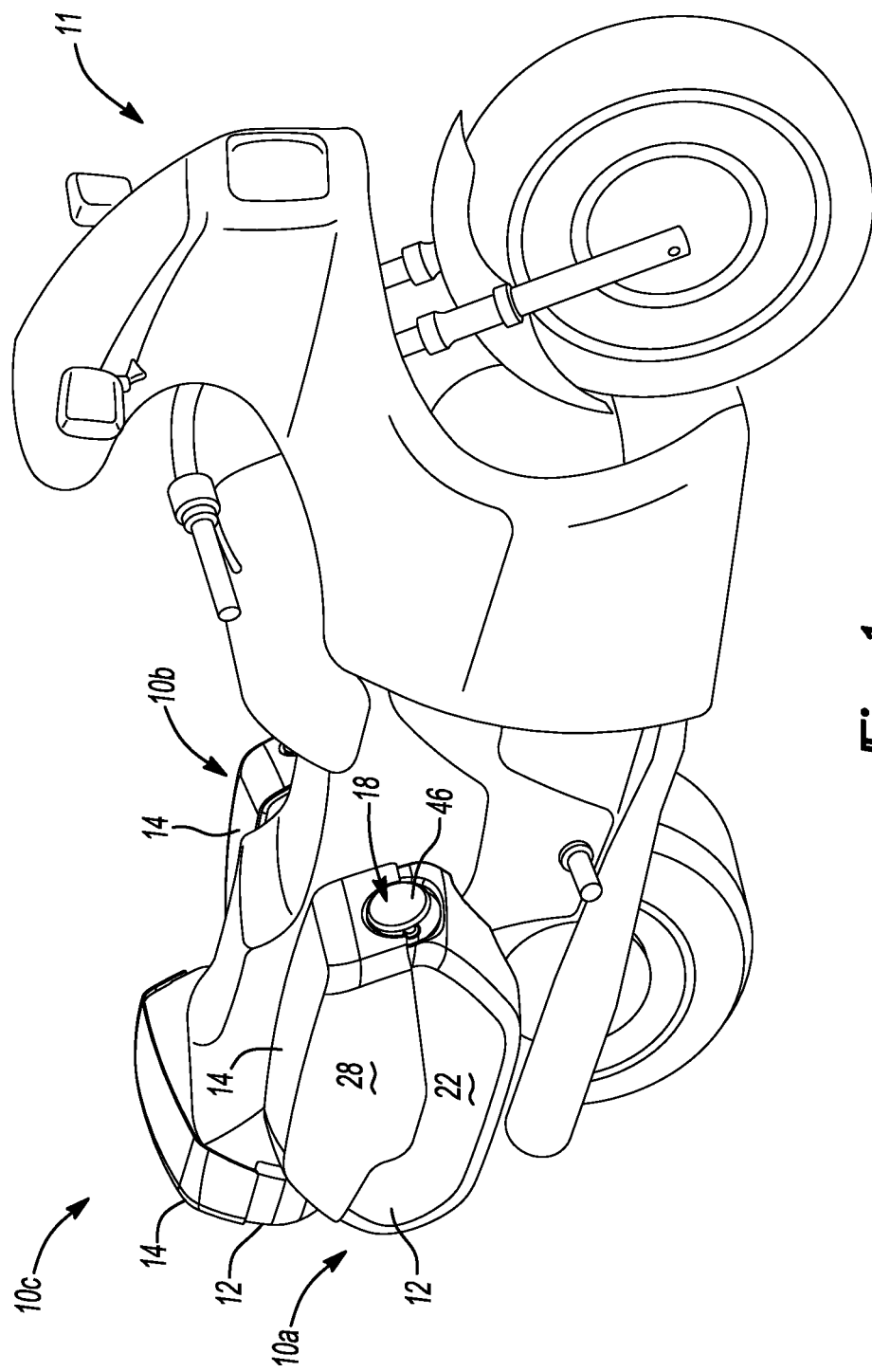
FIG. 1 illustrates a perspective view of a motorcycle including a motorcycle cargo storage system in the form of a side saddle bag in accordance with the principles of the present disclosure, in which a compartment body and compartment lid of the cargo storage system are in a closed and latched state.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1-5, a motorcycle cargo storage system 10 is illustrated in various stages of closure. The cargo storage system 10 is illustrated in the form of a single saddle bag that is adapted for attachment to a single side of a motorcycle (FIG. 1) and is likely to be used in conjunction with another side saddle bag that would be present on the other side of the motorcycle. It will be appreciated that the structure described below is not limited to merely motorcycle cargo storage systems of a side saddle bag type and may likewise be used in rear storage compartments or other types of vehicular-attached storage or storage compartments in general.

The illustrated cargo storage system 10 includes a compartment body 12 having a compartment lid 14 attached thereto. The compartment body 12 and the compartment lid 14 are attached to one another via a plurality of track connection members 16, which define a path of translation and rotation of the compartment lid 14 relative to the compartment body 12 between the closed position illustrated in FIG. 1 and the fully-opened position shown in FIG. 5. In the intermediate figures, the compartment lid 14 is illustrated being unlatched as in FIG. 2 (the latch assembly will be described in detail below) and then incrementally pulled back as in FIGS. 3 and 4 until the lid 14 is in the fully-opened position of FIG. 5 in which the compartment lid 14 is tucked behind a rear wall of the compartment body 12. The cargo storage system 10 further includes a securing mechanism 18 disposed at a forward end thereof that is used to selectively hold or lock the compartment lid 14 in the closed position relative to the compartment body 12.

The compartment body 12 has an inner surface 20 and an outer surface 22. The inner surface 20 of the compartment body 12 defines a compartment cavity 24 that may be used to store items of a rider during use of a motorcycle 11 (FIG. 1), for example.

The compartment lid 14 also has an inner surface 26 and an outer surface 28. When the compartment lid 14 is in the closed position of FIG. 1, the compartment lid 14 covers the compartment cavity 24 of the compartment body 12 such that the inner surface 20 of the compartment body 12 and the inner surface 26 of the compartment lid 14 are positioned in an adjacent configuration to define an internal storage volume 30 of the motorcycle cargo storage system 10. When the compartment lid 14 is in the opened position, the compartment lid 14 is positioned to allow access to the compartment cavity 24.

Now with reference to FIGS. 8-13, the securing mechanism 18 will be described in greater detail. The securing mechanism 18 includes two halves, one half of which is supported by the compartment body 12 and one half of which is supported by the compartment lid 14.

In the form illustrated, the compartment body 14 has a striker member 32 affixed to the outer surface 22 of the body 12 (for example, by bolting the striker member 32 to the body 12) which is in the form of a U-shaped, metal loop.

Figure 12:
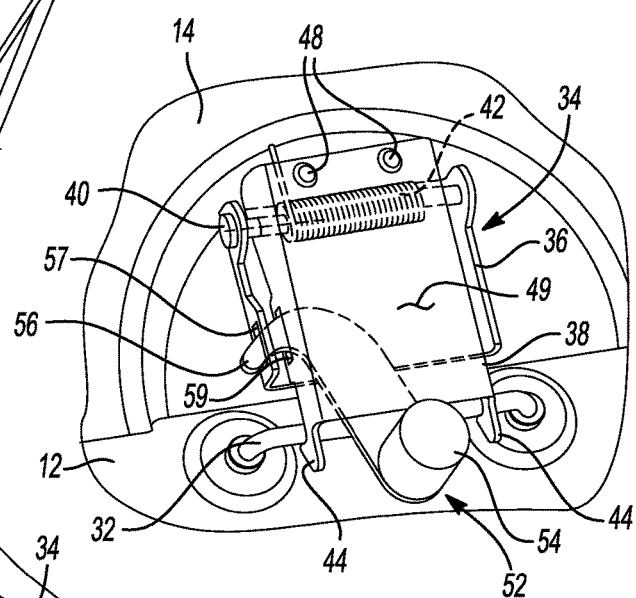
FIG. 12 is a perspective view of a lock assembly for use in conjunction with the motorcycle cargo storage system shown in a locked position.
Figure 13:
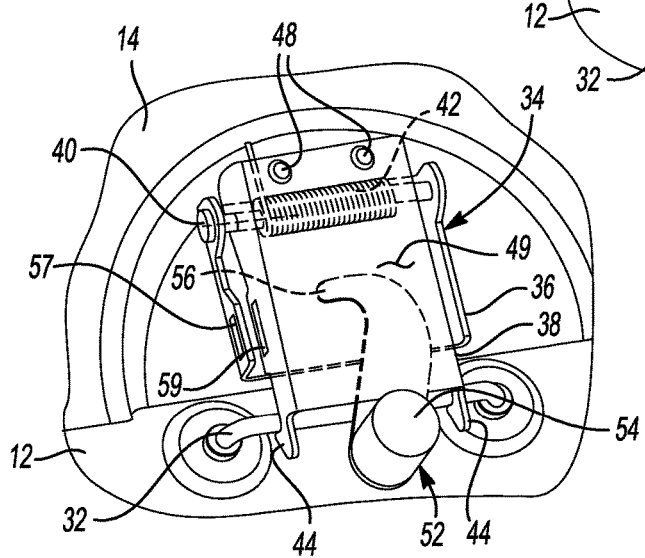
FIG. 13 is a perspective view of the lock assembly of FIG. 12 shown in an unlocked position.

The securing mechanism 18 also includes a latch assembly 34 which, in the form illustrated, is attached to the compartment lid 14. In the particular configuration, the latch assembly 34 includes a stationary mounting part 36 that is affixed to the outer surface 26 of the compartment lid 14. A movable latching member 38 is rotatably or pivotally connected to the stationary mounting part 36 by a pivot pin 40. As illustrated in FIGS. 12 and 13, at this point of connection of the pivot pin 40, there is also a biasing member 42 shown as a spring that is used to bias the latching member 38 angularly toward the stationary mounting part 36 (angularly, that is, relative to the axis of rotation defined by the pivot pin 40). On an end of the latching member 38 distally located relative to the pivot pin 40, the latching member 38 has a hook end 44 that is adapted for engagement with the striker member 32. Also pivotally attached to the pivot pin 40 is an outer cover 46 that substantially covers the latching member 38 and which may provide a decorative surface for an emblem, logo or so forth. At least within a prescribed angular range, the outer cover 46 and the latching member 38 are rotationally independent of one another. However, after a certain angular point of rotation (such as for example when the outer cover 46 is being lifted relative to the striker member 32), a back surface 47 of the outer cover 46 will encounter a set of elastomer stoppers 48 (FIG. 13) supported by a facing surface 49 of the latching member 38. Once the outer cover 46 engages the stoppers 48, the outer cover 46 and the latching member 38 are coupled to and rotate with one another. In this way, the lifting or rotation of the outer cover 46 can result in the lifting or rotation of the latching member 38 to disengage the latching member 38 from the striking member 38.

Figure 8:
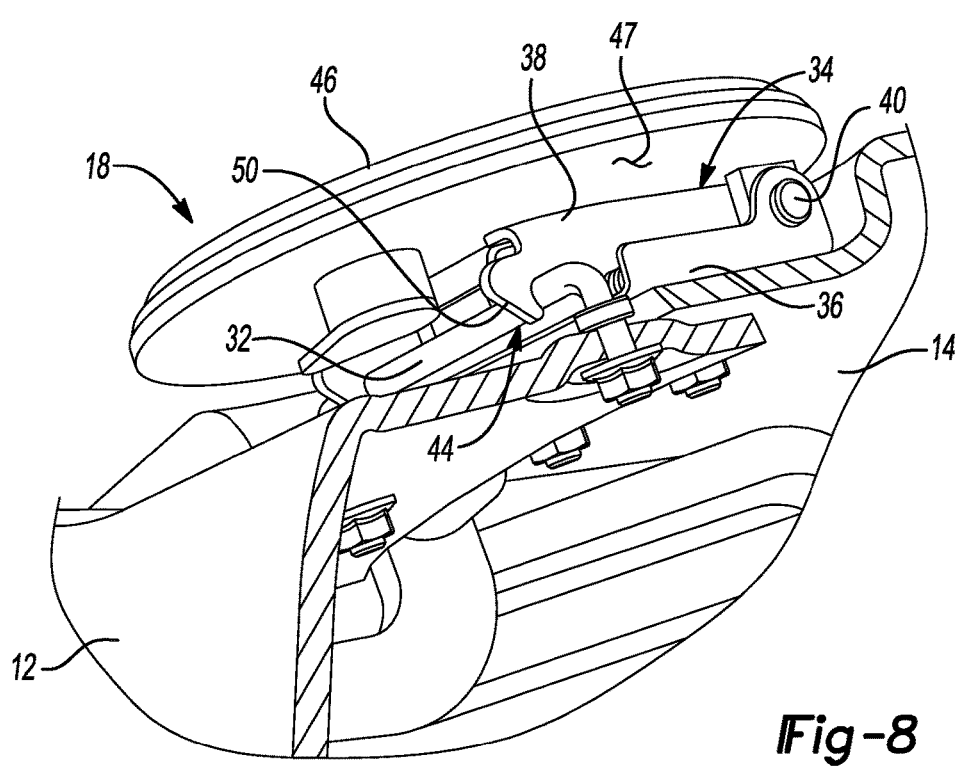
FIG. 8 is a perspective view of the latch mechanism showing a latching member and striker member in a latched or coupled state.
Figure 9:
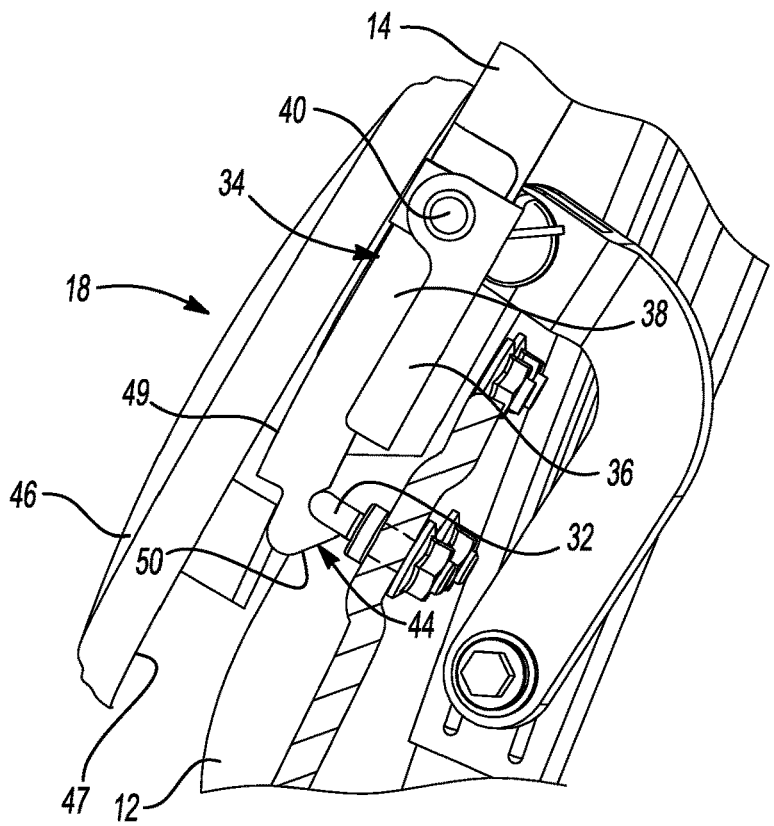
FIG. 9 is a side view of the latch mechanism of FIG. 8.

When the securing mechanism 18 is latched, the latch assembly 34 and the striker member 32 have the configuration illustrated in FIGS. 8 and 9. In this position, the hook end 44 of the latching member 38 is biased into engagement with the striker member 32. In this position, the compartment lid 14 can be held in the closed position relative to the compartment body 12 because, with the hook end 44 engaging the striker member 32, it is not possible for the compartment lid 12 to travel along the prescribed path of motion defined by the track connection members 16 as the hook end 44 snags on the striker member 32 to prevent the relative motion of the lid 12 and the body 14.

Figure 10:
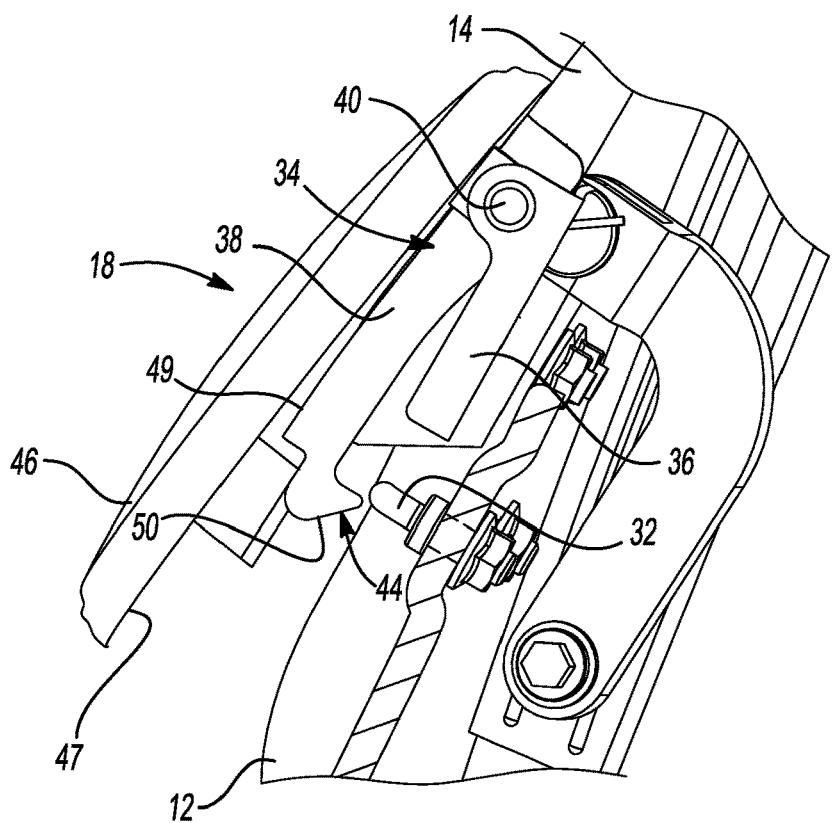
FIG. 10 is a side view of the latch mechanism of FIGS. 8 and 9 in an opened or unlatched state.

However, a user can lift the outer cover 46 to lift the latching member 38 (which, as noted above, are rotationally coupled to one another beyond a certain angular orientation of the outer cover 46), to cause the disengagement of the hook end 44 of the latching member 38 from the striker member 32. This disengaged position is illustrated in FIG. 10. At this position, the lid 14 can be moved relative to the body 12 as the securing mechanism 18 no longer restricts the travel of the lid 14 relative to the body 12. In fact, once the hook end 44 has cleared the striker member 32 and the lid 14 is partially opened, the latching member 38 can be released, as it will not restrict the movement of the lid 14 unless it is brought back into the vicinity of the striker member 32.

Figure 11:
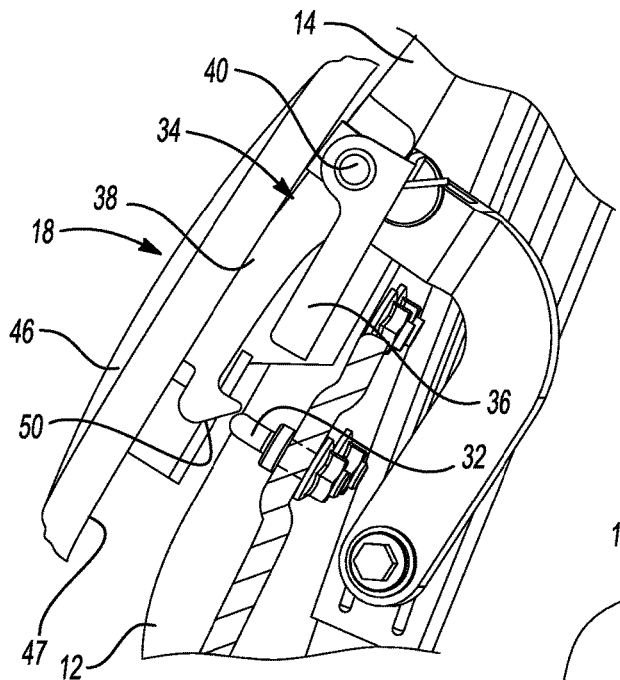
FIG. 11 is a side view of the latch mechanism of FIG. 10 showing a portion of the latch mechanism in contact with a striker member.

FIG. 11 shows what happens when the lid 14 is moved from an opened position back to the closed position. As the lid 14 approaches the closed position, a cam surface 50 disposed on the hook end 44 first engages the striker member 32. As the lid 14 and attached latch assembly 34 continues to travel toward the closed position, the cam surface 50 causes the hook end 44 of the latch mechanism to rotate upward as in FIG. 11 and against the bias exerted on the latching member 38 by the biasing member 42. At some point, the end of the cam surface 50 is reached and the hook end 44 snaps into the position shown in FIGS. 8 and 9 to again engage the striker member 32 and restrict the movement of the lid 14 relative to the body 12 (at least, until the outer cover 46/latching member 38 is again lifted).

With specific reference to FIGS. 12 and 13, it can be seen that the securing mechanism 18 can also be fitted with a lock assembly 52 having a rotatable cylinder 54 and lock pawl 56 in order to prevent lifting of the latch assembly 34. The lock assembly 52 is rotatably attached to the outer cover 46, which is not illustrated in FIGS. 12 and 13, to provide a more clear view of the operation of the lock assembly 52. In short, a key or other item (not shown) may be used to rotate the lock cylinder 54 relative to the outer cover 46 to rotate the lock pawl 56 between the engaged or locked position in FIG. 12 and the disengaged or unlocked position in FIG. 13. In the locked position, illustrated in FIG. 12, the pawl 56 extends through a pair of slots 57, 59 formed in the stationary mounting part 36 and the latching member 38, respectively, to prevent rotation of the latching member 38 about the pivot pin 40.

When the pawl 56 extends into the slots 57, 59, the hook end 44 of the latching member 38 is prevented from disengaging the striker member 32, as rotation of the latching member 38 relative to the mounting part 36 and, thus, the striker 32, is restricted. When the lock cylinder 54 is rotated, the lock pawl 56 is withdrawn from the slots 57, 59 to unlock the latching member 38 from stationary mounting part 36 to permit the latching member 38 to be lifted from the striker member 32 to disengage the hook end 44. Those having skill in the art will appreciate that this specific locking mechanism is just a single example of a locking mechanism and, instead of this specific locking mechanism, different types of locking mechanisms could be used (for example, a rotary cam coupled with a key cylinder). By use of the lock assembly 52, the use of the securing mechanism 18 can be restricted such that only authorized users (for example, users having a key) can access the internal storage volume 30 of the cargo storage system 10.

With the securing mechanism 18 having been described, the general operation of the cargo storage system 10 can be better explained.

As illustrated in FIG. 1, the cargo storage system 10 is initially closed, with the lid 14 fully covering the body 12. The securing mechanism 18 is latched to prevent the lid 14 from opening or moving relative to the body 12. That is to say, the securing mechanism 18 has the configuration illustrated in FIGS. 8 and 9.

Figure 2:
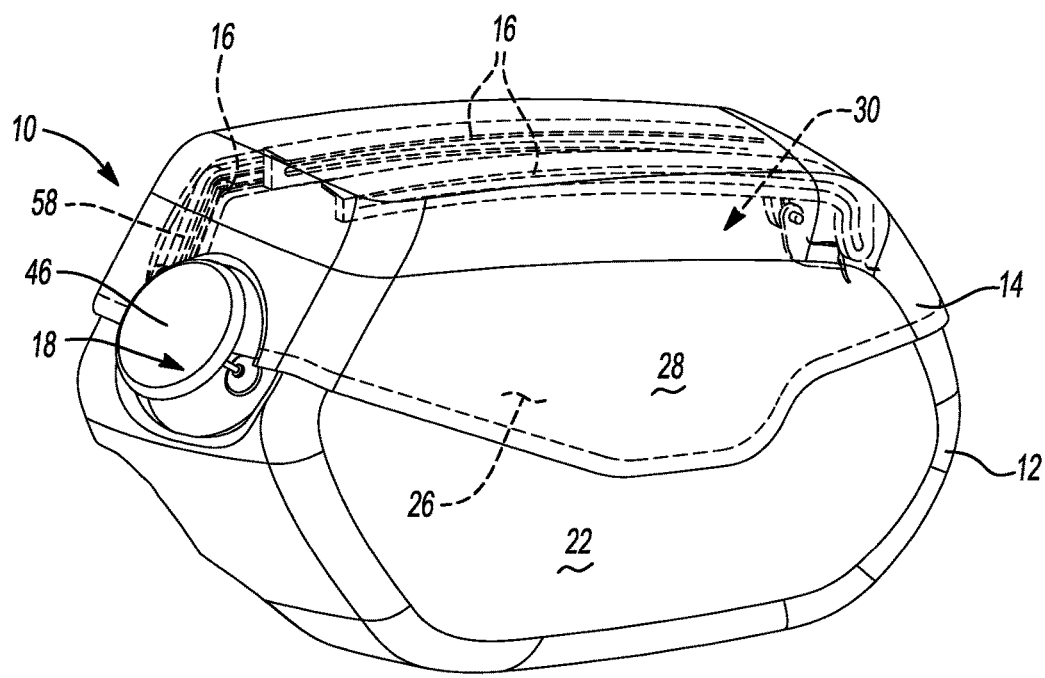
FIG. 2 illustrates a perspective view of the motorcycle cargo storage system of FIG. 1 with a latch assembly released and with the lid in an unlatched state.
Figure 3:
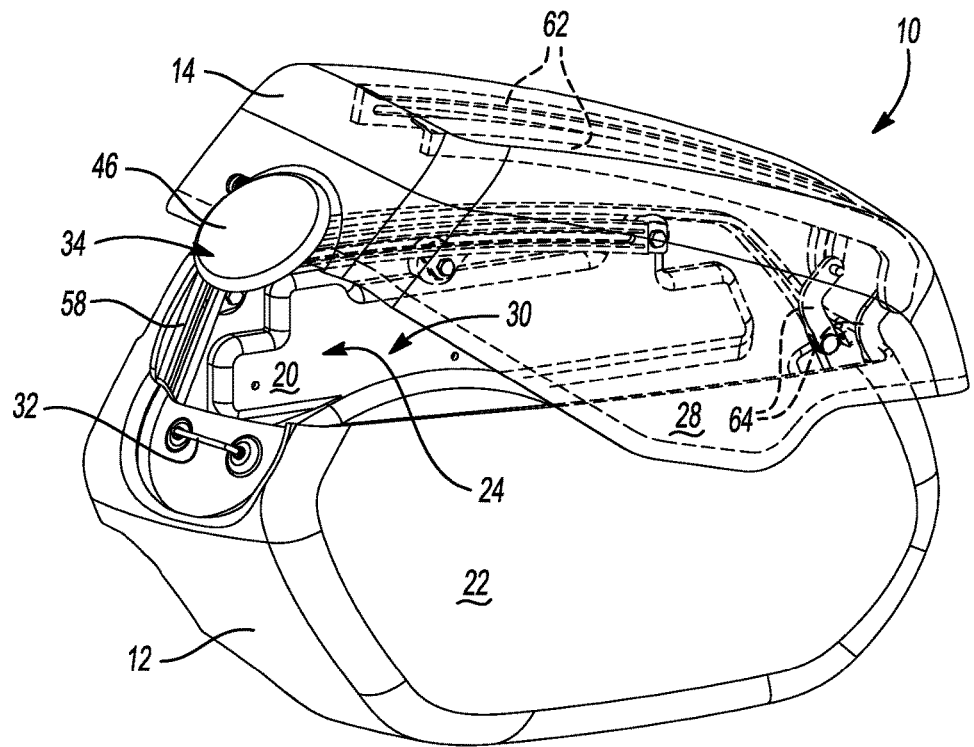
FIG. 3 illustrates a perspective view of the motorcycle cargo storage system of FIG. 1 with the lid unlatched from the body and traversing track connection members approximately thirty percent (30%) of the distance along the tracks.

In FIG. 2, the securing mechanism 18 has been unlatched by lifting the outer cover 46 to lift the latching member 38 and disengage the hook end 44 of the latching member 38 from the striker 32. This lifting action places the securing mechanism 18 in the configuration illustrated in FIG. 10.

At this point, and with the securing mechanism 18 unlatched, the lid 14 can be opened relative to the body 12 as is progressively illustrated in FIGS. 3-7. Notably, the track connecting member 16 defines a translational and rotational path of motion for the lid 14 relative to the body 12. The track connecting members 16 may include a cam track 58, a pin or follower 60, a pair of cam tracks 62, and a set of pins or followers 64. As can be seen in these figures, the inner surface 20 of the body 12 supports the track 58 into which the pin or follower 60 supported by the lid 14 is received and travels. The inner surface 26 of the lid 14 also supports the pair of tracks 62 into which the set of pins or followers 64 pivotally supported by the body 12 are inserted and travel. As the lid 14 moves relative to the body 12, these multiple tracked connection members 16 help to define the path of motion between the opened position and the closed position. Specifically, it can be seen that during opening, the front of the lid 14 tips up and back while the entirety of the lid 14 slides or translates back and down to provide clear entry into the compartment cavity 24.

The above movement is caused by the follower 60 moving along the track 58, which, in turn, causes the followers 64 to pivot relative to the body 12 such that the lid 14 rotates relative to the body 12. Pivoting of the followers 64 relative to the body 12 may be concurrently performed with movement of the followers 64 along the tracks 62 such that the lid 14 is moved in a direction toward the body 12 in an area near the followers 64 while the lid 14 is moved away from the body 12 in an area near the cover 46. See, for example, FIG. 4.

Figure 4:
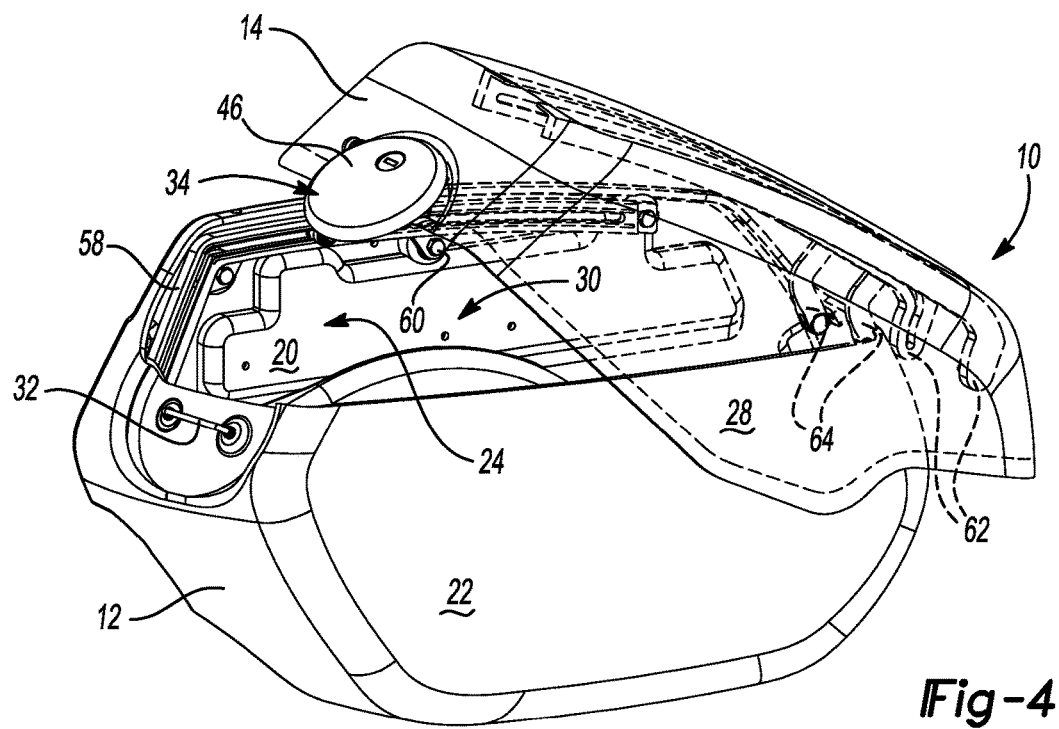
FIG. 4 illustrates a perspective view of the lid at approximately sixty percent (60%) of the distance along the tracks, at which point a lid follower link is now clearly visible within a cam track in the compartment body and cam links on the compartment body are further shown engaging the tracks of the lid.
Figure 5:
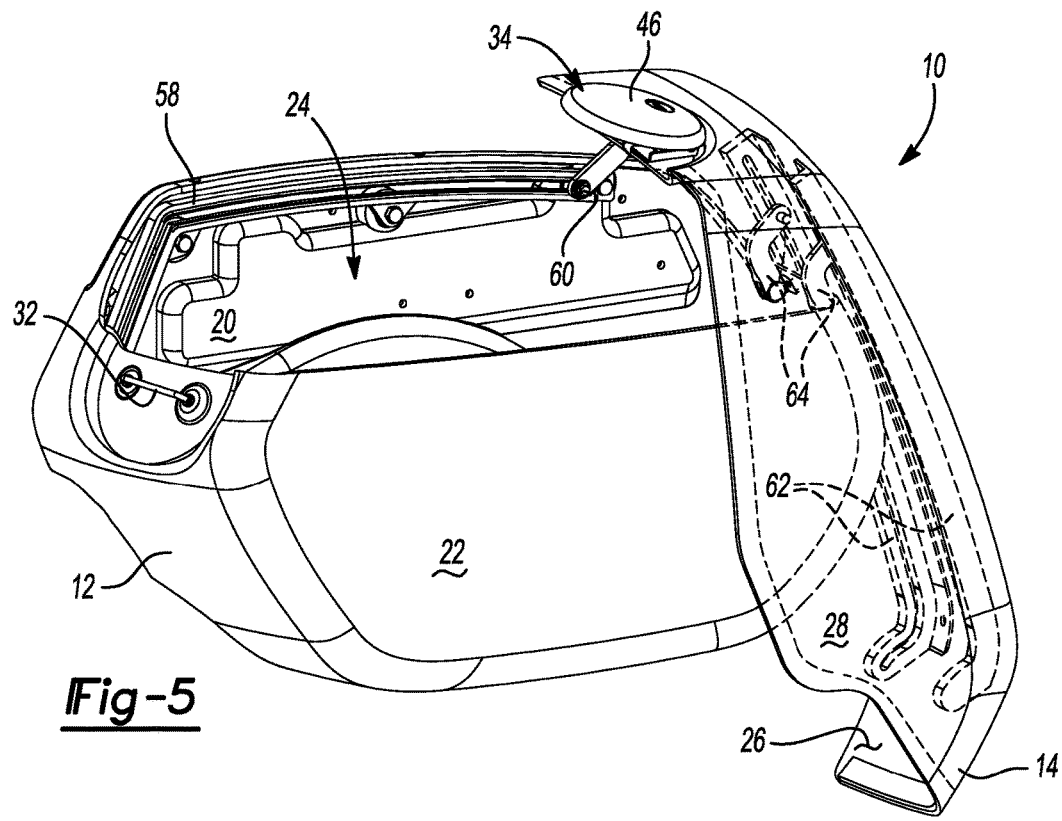
FIG. 5 illustrates a perspective view of the lid at a fully open position relative to the body with the followers at the end of the cam tracks and with the lid tucked along a rear wall of the compartment body.
Figure 6:
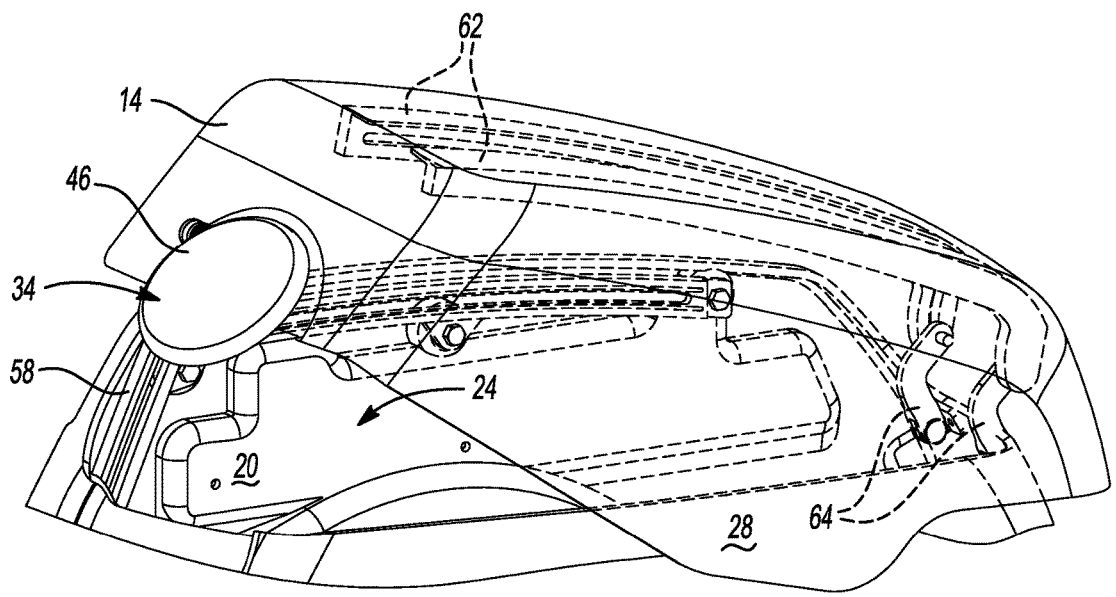
FIG. 6 provides a close-up perspective view of a portion of FIG. 3 illustrating the inner track associated with the compartment body and two rear followers engaged with tracks associated with the lid.
Figure 7:
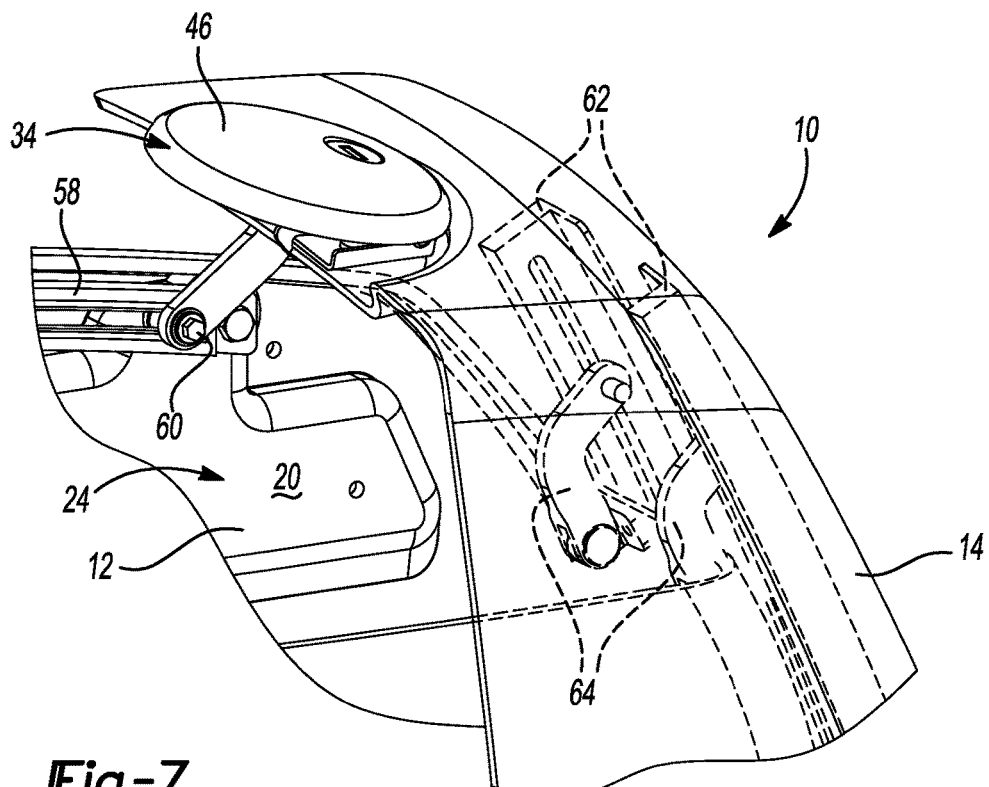
FIG. 7 provides a close-up perspective view of a portion of FIG. 5 illustrating interaction between the cam follower links and the lid in a fully opened position.

In this position, a force may be applied to the lid 14 to cause the follower 60 to traverse the track 58 and the followers 64 to traverse the tracks 62 such that the lid 14 moves or translates relative to the body 12. In so doing, the followers 60, 64 are brought into proximity with one another, as the follower 60 traverses the track 58 and the lid 14 is moved into the position shown in FIG. 5. The followers 60, 64 may each be disposed in a substantially linear or straight portion of the tracks 58, 62, respectively, at the same time to provide for such translation (FIGS. 4 and 5). Finally, the followers 64 may be permitted to traverse the tracks 62 when the follower 60 is located at an end of the track 58 to permit the lid 14 to rotate about the follower 60 and pivot into the position shown in FIG. 5.

In this way, the lid 14 can be opened and not disposed in a position at which it interferes with access to the internal storage volume, unlike traditional flap-style saddle bags.

The foregoing description of the embodiments has been provided for purposes of illustration and description. It is not intended to be exhaustive or to limit the disclosure. Individual elements or feature of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A motorcycle cargo storage system comprising:
   a compartment body operable to be attached to a motorcycle and having a first track;
   a compartment lid attached to the compartment body and having a second track;
   a first track connection member having a first end rotatably coupled to the compartment lid and a second end translatably coupled to the first track; and
   a second track connection member having a first end rotatably coupled to the compartment body and a second end translatably coupled to the second track.

2. The motorcycle cargo storage system of claim 1, wherein at least one of the first track and the second track is generally L-shaped.

3. The motorcycle cargo storage system of claim 1, wherein the compartment lid is configured to rotate and translate relative to the compartment body from a closed position to an open position.

4. The motorcycle cargo storage system of claim 3, wherein the compartment lid includes a lid inner surface and the compartment body includes a body inner surface, the lid inner surface and the body inner surface defining an internal storage volume in the closed position.

5. The motorcycle cargo storage system of claim 4, wherein the compartment lid allows access to the internal storage volume in the open position.

6. The motorcycle cargo storage system of claim 3, further comprising a latch assembly movable from a locked position to an unlocked position, the latch assembly securing the compartment lid in the closed position when the latch assembly is in the locked position.

7. The motorcycle cargo storage system of claim 6, wherein the latch assembly includes a striker supported by the compartment body and a latch rotatably supported by the compartment lid.

8. The motorcycle cargo storage system of claim 7, wherein the latch includes a hook engaging the striker when the latch assembly is in the locked position.

9. The motorcycle cargo storage system of claim 8, wherein the hook includes a lock surface and a cam surface opposite the lock surface, the lock surface engaging the striker in the locked position, the cam surface operable to engage the striker in the unlocked position.

10. The motorcycle cargo storage system of claim 1, wherein the first track connection member includes a first pin translatably disposed within the first track.

11. The motorcycle cargo storage system of claim 10, wherein the second track connection member includes a second pin translatably disposed within the second track.

12. The motorcycle cargo storage system of claim 1, wherein the first track includes a first cam and the second track includes a second cam, the first cam receiving the first track connection member and the second cam receiving the second track connection member.

13. A motorcycle cargo storage system comprising:
   a compartment body operable to be attached to a motorcycle;
   a compartment lid;
   a first L-shaped track coupled to the compartment body; and
   a first track connection member having a first end rotatably coupled to the compartment lid and a second end translatably coupled to the first L-shaped track.

14. The motorcycle cargo storage system of claim 13, further comprising a second L-shaped track coupled to the compartment lid and a second track connection member having a first end rotatably coupled to the compartment body and a second end translatably coupled to the second track.

15. The motorcycle cargo storage system of claim 13, wherein the compartment lid is configured to rotate and translate relative to the compartment body from a closed position to an open position.

16. The motorcycle cargo storage system of claim 15, wherein the compartment lid includes a lid inner surface and the compartment body includes a body inner surface, the lid inner surface and the body inner surface defining an internal storage volume in the closed position.

17. The motorcycle cargo storage system of claim 13, further comprising a latch, a biasing member, and a striker, the latch coupled to the compartment lid for rotation about a first axis, the biasing member operable to rotate the latch in a first direction about the first axis from an unlatched state to a latched state, the striker coupled to the compartment body and configured to rotate the latch in a second direction about the first axis, the second direction opposite the first direction.

18. The motorcycle cargo storage system of claim 17, wherein the latch secures the compartment lid relative to the compartment body in the latched state.

19. The motorcycle cargo storage system of claim 17, further comprising an outer cover rotatably coupled to the compartment lid, the outer cover being rotatable relative to the latch about the first axis within a prescribed angular range.

20. The motorcycle cargo storage system of claim 19, wherein the outer cover rotates with the latch about the first axis outside the prescribed angular range.

21. The motorcycle cargo storage system of claim 19, wherein the striker is operable to rotate the latch relative to the outer cover in the second direction about the first axis.

22. The motorcycle cargo storage system of claim 19, wherein the outer cover includes an outer surface having at least one of a vehicle logo and an emblem.

* * * * *